United States Patent [19]

McAvinney et al.

[11] Patent Number: 4,968,877

[45] Date of Patent: Nov. 6, 1990

[54] VIDEOHARP

[75] Inventors: Paul McAvinney; Dean H. Rubine, both of Pittsburgh, Pa.

[73] Assignee: Sensor Frame Corporation, Pittsburgh, Pa.

[21] Appl. No.: 244,822

[22] Filed: Sep. 14, 1988

[51] Int. Cl.$^5$ ........................ G01H 1/34; G01H 7/00; G01V 9/04

[52] U.S. Cl. ........................ 250/221; 84/639; 84/645

[58] Field of Search ........................ 250/221, 222.1; 84/1.01, 1.03, 1.18, 639, 645

[56] References Cited

U.S. PATENT DOCUMENTS

| | | | |
|---|---|---|---|
| 4,517,559 | 5/1985 | Deitch et al. | 250/221 |
| 4,686,880 | 8/1987 | Salani et al. | 84/1.01 |
| 4,776,253 | 10/1988 | Downes | 84/1.03 |

*Primary Examiner*—Edward P. Westin

*Attorney, Agent, or Firm*—Reed Smith Shaw & McClay

[57] ABSTRACT

The VideoHarp is an optical-scanning device for sensing and tracking the movement of multiple fingers which is then used to control the generation of light or sound or to control the motion of other physical objects. Preferably, the VideoHarp detects the images of a performer's fingertips using a single sensor. From these images, the movement of each fingertip is tracked and this information is translated into a standard output, which is preferably used to control a device which generates sound or light. The translation of the finger motion into control signals is programmable, enabling the VideoHarp to be played using a variety of different types of motions and gestures. For example, the VideoHarp may be played with harp-like or keyboard like gestures, by bowing or drumming motions, or even by gestures and motions with no analogue in existing instrument techniques.

13 Claims, 4 Drawing Sheets

VIDEOHARP

FIELD OF THE INVENTION

The present invention relates to a gesture sensing device which detects the position and spatial orientation of a plurality of light occluding objects and more particularly to one which generates command signals to create or control sound, light and/or the motion of physical objects.

BACKGROUND OF THE INVENTION

Various devices for detecting the position of passive objects are known, such as the devices disclosed in U.S. Pat. Nos. 4,144,449 and 4,247,767. These devices, however, are limited to detecting position and cannot detect multiple finger gestures. Moreover, they are fairly complicated and require frames and encompassing light sources as well as several sensors, the latter being fairly expensive. U.S. Pat. No. 4,746,770 discloses a method and device for isolating and manipulating graphic objects on a computer video monitor. This device which also uses a frame and several sensors is not easily adapted to playing and generating music, although it can detect multiple fingers.

Detecting position and using it to control music is described in Max Mathew's "The Sequential Drum" in *Computer Music Journal*, Vol. 4, No. 4 (Winter 1980). The device described in this article, however, only detects the movement of one finger and also requires the use of several sensors.

It would be desirable, therefore, to have a gesture sensing device which was particularly adept at sensing and tracking the movement of multiple fingers and which could use these gestures to generate or control sound, light and/or the motion of physical objects. Preferably, this device could simultaneously extract several parameters from the movement of multiple fingers and use these parameters to control the creation of sound and/or light. It would also be desirable to have a gesture sensing device which would be easily playable as a musical instrument and which did not require an elaborate frame and several sensors.

SUMMARY OF THE INVENTION

The VideoHarp is a gesture-sensing device which senses optically-scanned fingers, tracks their movement and maps the resulting gesture into a standard output signal format such as MIDI codes. The gestures and/or motions are used to generate or control music, lights or the movement of other physical objects. While the following discussion relates primarily to the generation and control of music, it is evident to one skilled in the art that the present invention could also be used to map gestures into a format which would control lights or the movement of physical objects.

The mapping of gestures into output signals is programmable in the present invention. As a result, the potential variety of movements, gestures or playing techniques which can be detected and used is very great and is much greater and more diverse than that found in traditional musical instruments. Instead of the usual situation where the music generated is limited by the range of gestures which can be used on an instrument, the VideoHarp makes it possible to tailor the instrument to almost any kind of gestures or finger motions, thereby generating a wide variety of output signals and thus music. The VideoHarp, as a result of its versatility, can open new avenues of musical expression to both composers and performers alike.

Generally, the VideoHarp is a gesture sensing device used for controlling the generation of sound, light and/or the motion of other physical objects comprising a physical instrument at which the user or performer gestures and a gesture mapping means which translates or maps the detected gestures into control signals which are used by a synthesizer or other device to generate or control music, light or physical objects. Typically, the gesture sensing device comprises at least one gesture sensing surface, preferably a flat one, a light source and a sensor. The sensor detects the pattern of light and dark falling on it as a result of a plurality of light occluding objects, such as fingers, being placed in close proximity to the gesture sensing surface. The mapping means translates the detected pattern of light into the output signals which control the synthesizer or other device and are preferably in the form of standard musical instrument digital interface (MIDI) signals.

Preferably, the gesture sensing device uses a physical instrument which comprises a plurality of gesture sensing surfaces joined along an edge, a light source also located at the joined edge which illuminates an area above each gesture sensing surface, a reflective means for each surface located at an edge opposite the light source and a sensor. Preferably, only one sensor is used which is located between the gesture sensing surfaces so that it is out of the way and protected from being damaged.

In a preferred embodiment, the physical instrument utilizes two gesture sensing surfaces, one light source and one sensor which preferably is a sensor array. The light source illuminates an area just above the flat surface. Several light occluding objects, such as fingers, are inserted into this area. The sensor detects the pattern generated by the fingers and, with the help of an electronic controller such as a microprocessor, uses the pattern to generate MIDI control signals. A microphone can also be used in connection with the physical instrument. If a condenser mike is located behind the gesture sensing surface, it could audibly detect the sound of a performer's fingers tapping the gesture sensing surface. The input from the mike is fed to the gesture mapping means and is used to improve the accuracy of certain measurements such as object arrival time and velocity.

The present invention builds upon the method disclosed in U.S. Pat. No. 4,746,770, the disclosure of which is incorporated herein by reference as if set forth in full. Other details, objects and advantages of the present invention will become more readily apparent from the following description of a presently preferred embodiment thereof.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
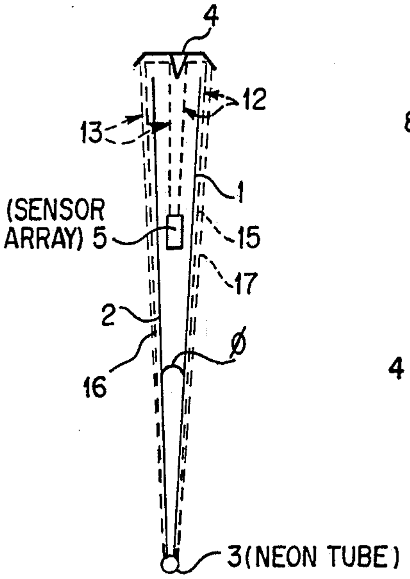
FIG. 1 is a top view of one embodiment of the VideoHarp.
Figure 2:
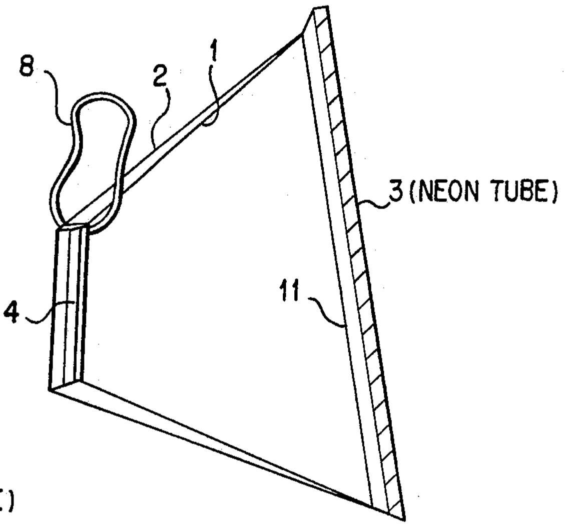
FIG. 2 is a side view of the VideoHarp shown in FIG. 1.

The physical instrument 10 of the present invention preferably comprises two flat, equilateral triangular plates 1 and 2, each about three feet on a side which serve as the gesture sensing surfaces. The plates are joined together at their bases at an acute angle $\phi$, preferably of approximately 18°. The thinner the angle $\phi$ the better since the instrument becomes less bulky and is easier to play. A neon tube 3 is used as the light source and is mounted parallel to the joined edges in such a way that it is visible from the opposite vertex along the outside of each plate. In one embodiment, the vertex opposite the joint is truncated, and a mirror assembly 4 is placed there and used as the reflective means. Positioned in between the plates 1 and 2 is a sensor array 5, such as the one used in U.S. Pat. No. 4,746,770, as well as the part of the associated control means and a power supply 7 for the neon tube 3. As a result of this configuration, the device is self contained with its output being the control signals which are carried by a cable to the device which actually generates the music.

The VideoHarp can be played in either a standing or sitting position. While standing, the performer straps the device on using the neckstrap 8 or a shoulder harness. He holds it in a vertical position so that the reflective means, in this case the mirror assembly 4, rests against his abdomen. To play the VideoHarp, the fingers of the left hand touch the left triangular plate 2 and the fingers of the right hand touch the right triangular plate 1. The plates themselves are used only for reference since it is the fingers that the instrument 10 senses. Alternatively, the VideoHarp may be mounted vertically on a stand. More interestingly, the instrument may be placed horizontally on a stand, allowing the top plate 1 to be played like a keyboard or drum, while the bottom plate 2 can be played with the performers knees if desired. The horizontal mounting allows a number of VideoHarps to be placed together in various configurations. For example, six VideoHarps may be arranged in a hexagon configuration, completely surrounding the performer.

The operation of the physical instrument can best be explained by considering each triangular plate 1 and 2 separately. From a functional standpoint, the neon tube 3 sits along the base 11 of the triangle, and the sensor 5 sits at the opposite vertex. The purpose of the mirror assembly 4 is to 'fold' the triangle (i.e., the light paths 12 and 13) so that a single sensor 5 can be used to detect light across both plates 1 and 2. This reduces the cost of the device and greatly simplifies its construction. Furthermore, placing the sensor 5 between plates 1 and 2 makes it very difficult for the performer to accidentally bump the sensor 5 out of alignment, giving a more sturdy and reliable device. The space between the two plates 1 and 2 also provides a convenient area for housing the additional electronics such as the control means and the power supply 7 without increasing the size of the instrument 10.

The light source such as neon tube 3 along the base and the one sensor 5 at the opposite vertex are seen by both plates 1 and 2. Normally, the sensor 'sees' the light source as an unobstructed strip of light. When the performer places his fingers on the plate, they partially eclipse the light and form a pattern of dark images on the sensor 5. It should be noted that since the VideoHarp senses light contrast, it may be played not only with fingers, but with many other opaque objects. For simplicity of explanation when the word 'finger' is used herein, it will be understood as referring to any light occluding object used to play the VideoHarp. The sensor no longer sees a single continuous light strip. Rather, the light strip is now broken into a number of segments by the finger shadows. It is the angle that the edge of a finger makes with the sensor that determines where the light strip that the sensor sees is broken. The presently used sensors have a resolution of about a quarter degree over the full sixty degree field of view. There are sensors available which can double this resolution; however they are more expensive.

The pattern of shadows and light along the light strip describe the angles of the fingers in the gesture-sensing plane 15, which is slightly above and parallel to each triangular plate. The pattern may be succinctly described by a list of angles where the shadow becomes light or vice versa. This list of angles is called a ray list, and it is used to mathematically describe the occlusions of the light source in the gesture-sensing planes 15 and 16 which are defined by light paths 12 and 13, respectively.

Typically, the performer's fingers may appear to the sensor 5 to be anywhere from one to six degrees wide. However, by averaging two consecutive numbers in the ray list (representing the angles of each of the two edges of a finger), the finger angle can be computed to the nearest quarter-degree. The apparent thickness of a finger, which is nothing more than the difference in degrees of consecutive ray list numbers, is also a measure of how close the finger is to the sensor 5.

One embodiment of the VideoHarp monitors a single gesture-sensing plane above each of the two triangular plates 1 and 2. Each gesture-sensing plane 15 and 16 is about one-eight inch above its corresponding plate. The sensor 5 is able to produce a ray list for each plane at the rate of 30 per second (30 Hz). This includes an inherent time lag due to the sensor. While this scan rate is usable, a higher scan rate will make the instrument more responsive by improving its temporal resolution. This can be accomplished in a variety of ways including increased CPU speed in the control means and interleaving of the sensor. Another way would be by using a faster sensor.

The sensor 5 itself is able to sense in more than one plane. This is why one sensor can be used in the present invention to sense the two gesture sensing planes 15 and 16. This feature can also be used to sense in two planes above each plate, an inner gesture sensing plane 15 and an outer gesture sensing plane 17. The inner plane 15 is about one-eighth inch above the plate 1 and has been discussed above while the outer plane 17 is about one-quarter inch above the plate 1. As before, a ray list for each plane 15 and 17 is produced by the sensor at the rate of 30 Hz. By computing the difference between the time when a finger enters the outer plane 17 and the inner one 15, the present invention is able to measure the z-axis velocity at which a finger strikes the plate 1. The ray lists for the two planes 15 and 17 also enable the device to compute a component of the angle of the finger with respect to the plate.

As has been discussed above, the presence of fingers in the gesture-sensing plane causes the sensor to generate ray lists which now must be mapped by the gesture mapping means into MIDI codes. In one embodiment the gesture mapping means comprises two computing devices, however all the functions could be contained in one device such as the control means.

Figure 3:
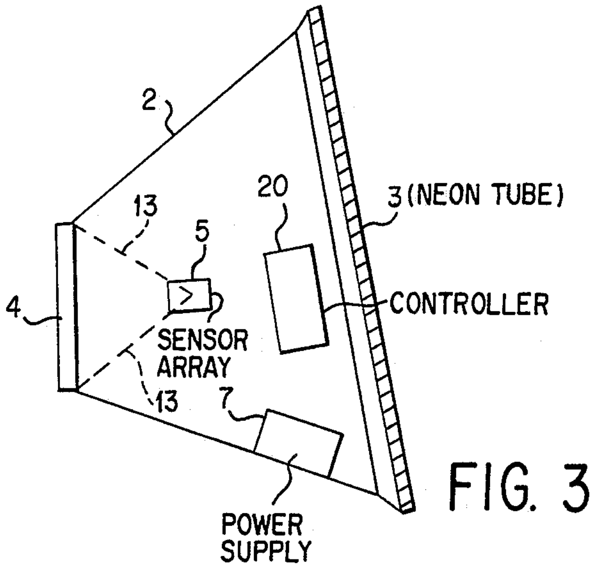
FIG. 3 is a cut-away of the side view of the VideoHarp shown in FIG. 2.

The sensor 5 is electrically connected to the gesture mapping means, which in one embodiment is a small controller 20 connected to an IBM-XT (not shown). The controller 20 comprises a circuit board containing a MC68008 microprocessor, 128 Kbytes of RAM, a timer, and a XYLINX logic cell array which acts to tie the various components together. Preferably, the controller 20 is positioned between the triangular plates 1 and 2 and behind the sensor 5 as shown in FIG. 3. The controller is presently connected via a ribbon cable to an IBM-XT slot (not shown) outside the instrument 10. The XT has a Roland MPU-401 which generates MIDI outputs and can also receive MIDI inputs.

Figure 4:
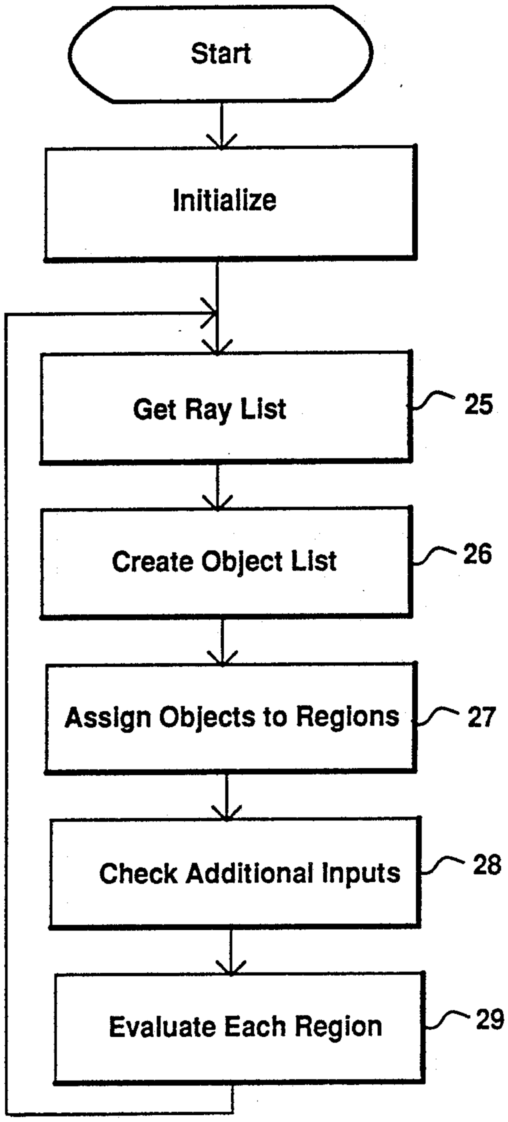
FIG. 4 is a block diagram of the gesture mapping process performed by the control means.
Figure 5:
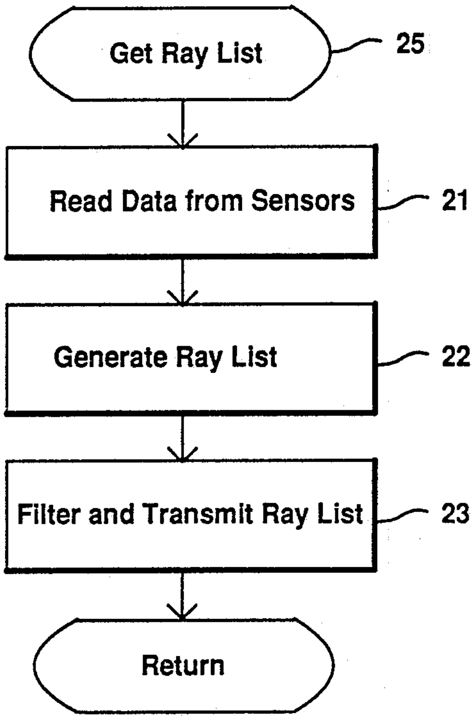
FIG. 5 is a block diagram of the get ray list step shown in FIG. 4.

The gesture mapping process is shown in FIG. 4 and in this embodiment is partitioned between the controller 20 and the XT. The controller's task, as shown by step 25 in FIG. 4 and in more detail in FIG. 5, is to: in step 21, read the data from the sensor; in step 22, convert the data to ray lists; and in step 23, filter the ray lists and transmit them to the XT. The filtering done in step 23 is to eliminate ray lists which are too wide or too narrow. The XT implements the higher level mapping shown by the steps in FIG. 4 which translates ray lists to MIDI codes, and then transmits the MIDI codes to the synthesizer(s). The use of the XT can be eliminated by augmenting the controller 20 to enable it to process the rays lists and to send and receive MIDI codes and thereby function as the control means.

The first step 26 in the gesture mapping process shown in FIG. 4 after getting the ray lists is to convert them to object lists. An object, as that term is used herein, is the set of attributes used to describe a single finger visible to the sensor An object is represented by the tuple (s, $\theta$, t, time, z, uid) where:

s is the side of the VideoHarp where the object appeared and has the value Left (if the object is on the left side) or Right.

$\theta$ is the angle which the center of the object makes with the sensor and bottom of the plate. Its value ranges from 0 (along the bottom) to 255 (along the top), each unit being approximately one-quarter degree.

t is the apparent angular thickness of the object and is in the same units as 0. ranges from 1 for thin objects to 255 for objects which block all light on the sensor.

time is the time at which the object first penetrated the inner plane 15.

z is a small amount of information indicating the direction of the object. Its value is one of the following:

(a) In—the object has just appeared; (b) Out—the object has just disappeared; (c) Split—the object has just appeared, seemingly out of nowhere, but actually what has happened is that two fingers previously touching (thus appearing to be one object) have separated and now are seen to be multiple objects; (d) Merged—the object was formed by two or more fingers whose images have now merged; and (e) Existing—the object had previously been in view (its $\theta$ or t values may have changed since the last object list)

uid is a unique object identifier used to identify an object while it is in view. The idea here is that each finger be tracked by the same object for is long as it can be seen. Currently, when the images of two fingers merge, the two fingers form a single object with a new uid. The old identifiers are saved as sub-objects of the new object. If the fingers separate, the saved identifiers are reassigned to the Split objects.

Figure 6:
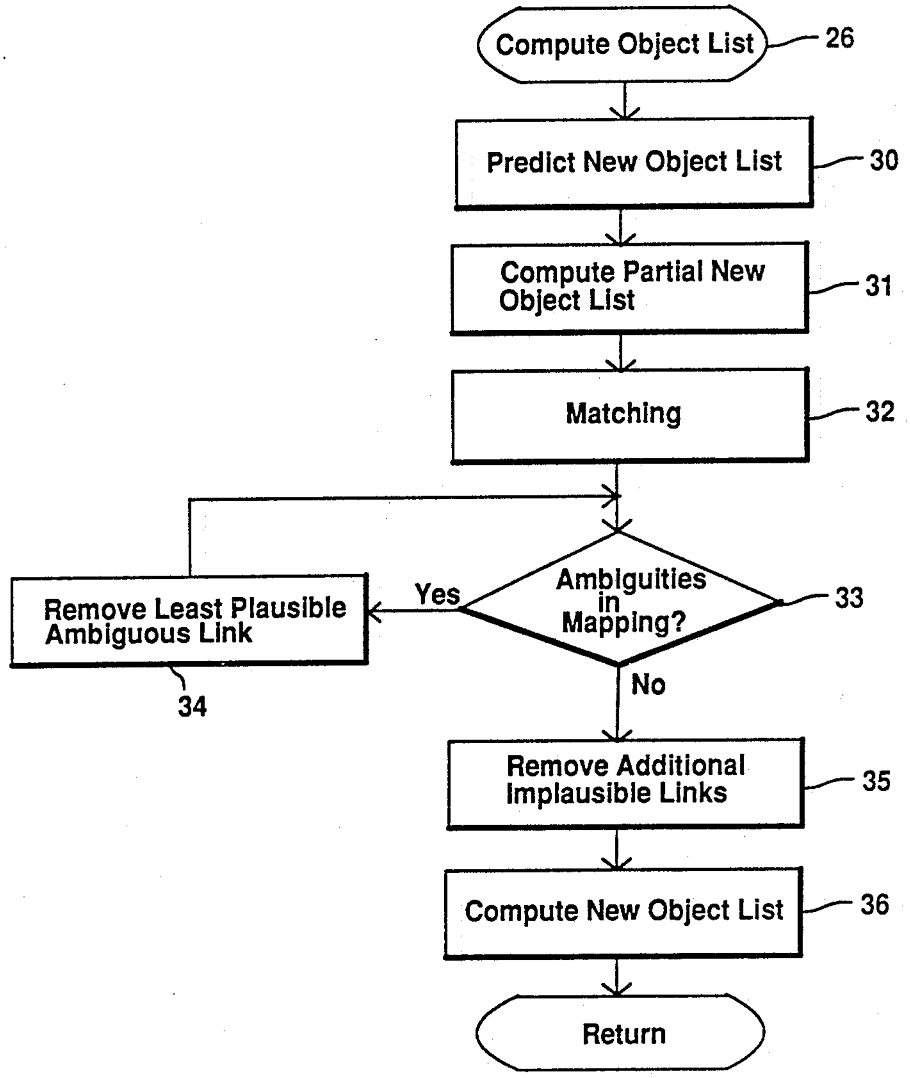
FIG. 6 is a block diagram of the create object list step shown in FIG. 4.

Translating the two ray lists (one for each gesture sensing plane 15 and 16) into object lists is a relatively straightforward process and is shown in detail by the steps in FIG. 6. Each plane can be considered separately, the only difference between them being the s attribute. For each side, the gesture-mapping means uses a new ray list for that side and the previous object list for the side to generate a new object list. Before the new ray list is input from the sensor in step 25, the previous object list is used to predict what the new object list will be in step 30. For each object, its current position and thickness, as well as its rate of change of position and thickness, is used to predict the object's new position and thickness. The new ray list is then input and turned into a partial object list in step 31, giving $\theta$ and t for each ray pair (i.e. finger image). Then the predicted object list and partial new object list are matched in steps 32–35. For each predicted object there is a window, currently three times the predicted t, centered on its 8, and objects from the new list which fall into this window are considered by the gesture-mapping means to represent the same finger.

Once the matchings in steps 32–35 are done, the new object list can be computed in step 36. An object from the new ray list not matched with any objects in the predicted object list is given a z designation of "In". If multiple objects from the new ray list are matched to a single object in the predicted object list, the new objects must all be "Split". Similarly, an object from the new ray list matched to more than one object in the predicted list is "Merged". Any new object matched exclusively to a single predicted object (which itself is matched exclusively to the new object) is "Existing". The only ambiguous case is when an object participates in both a "Split" and a "Merge". This ambiguity is resolved in steps 33–35 by repeatedly deleting the match with the largest distance between the actual new object and the predicted object until the ambiguity no longer exists.

Once the new object list is computed, the next step 27 in FIG. 4 is assign each object to a region. Intuitively, a region is an area in the gesture sensing plane of the VideoHarp which has its own translation function from the objects in the region to MIDI data. Technically, a region is defined by a choice of s (Left or Right), and a range restriction (upper end lower bounds) on both $\theta$ and t. Thus a region does not exactly correspond to an area of the plates 1 or 2 since a large value of t may either correspond to a single finger very close to the sensor which is casting a large shadow or a number of fingers clustered together which appear as a single object far away from the sensor.

Typically, there are a number of active regions in the physical instrument 10. Objects appearing, moving, and disappearing in a region usually cause MIDI events to be sent from the VideoHarp which results in changes in the music being generated. The performer will usually set up a number of nonoverlapping regions that may be played simultaneously, and group them together as a VideoHarp preset. During a performance, the performer can easily switch between VideoHarp presets and thus instantly change the playing characteristics of the VideoHarp.

Each region results in a particular mapping into MIDI signals. To do this, a number of variables are computed for each region. Typically, there are two kinds of variables' monophonic and polyphonic. There is only a single instance of each monophonic variable in a region. There is an instance of each polyphonic variable for each object that occurs in a region. In either case, the set of variables is programmable. The performer can specify the variables he wishes to generate, how changes in the variables trigger specific MIDI events, and which bytes in the MIDI codes have values given by which particular variables.

Each type of region is implemented by some code which lists the various monophonic and polyphonic variables used in this region and has a function which is evaluated in step 29 every time a ray lift is processed into objects and regions. The function takes as input a region descriptor which contains the monophonic variables as well as other region data, the current state of the objects, as well as a list of region objects each of which contains a set of polyphonic variables. The function computes new values for the polyphonic and monophonic variables as well as sending out the signals for the appropriate MIDI codes. It can also take into account additional inputs in step 28 such as inputs from a microphone, inputs from other VideoHarps is well as any other MIDI input.

Each region has certain attributes which determine exactly which objects will appear in that region's object list. For example, region may be "possessive" in which case once an object enters the region it will always be placed in that region's object list even when it wanders into another region. Another interesting region attribute is finger-tracking. Finger-tracking regions never have "Merged" or "Split" objects in their object list. Instead, the sub-objects that make up the "Merged" object appear directly in the object list. Similarly, "Split" objects will appear as "Existing" objects when they come from previously "Merged" objects, or as either "Existing" or "In" objects otherwise.

The gesture mapping of the input from sensor 5 to MIDI codes is very general so as to enable many different kinds of gestures to generate many different kinds of MIDI codes. The MIDI codes that are sent in response to an event in a region are afterable by the performer. Default codes are provided for the parameters and MIDI codes to allow a performer to experiment easily with the different regions.

A variety of different regions have been successfully implemented in the VideoHarp. Keyboard regions are basically designed to be played with a keyboard-like technique. Each finger entering the region causes a note to sound. The attributes of the note are a function of the attributes of the finger that caused the note to sound. In keyboard regions, $\theta$ maps to MIDI pitch, the initial t to MIDI velocity, and subsequent t values map to MIDI key pressure aftertouch. Alternatively, uid or position in a given sorting criteria can be mapped to MIDI channel. In the situation where MIDI channel is computed, it is possible to send MIDI pitch bend codes on a per finger basis. In these cases, the amount of motion for a given pitch bend can be set independently from the spacing between the notes. The keyboard regions are mainly polyphonic, though some monophonic variables can be used. For example, one may map the size of the thickest finger onto MIDI modulation wheel, MIDI breath controller or MIDI channel pressure codes. Other global attributes may be mapped into these or other controller codes.

Another type of region is a bowing region which simulates the control one gets by bowing a string instrument. Only the bowed hand is simulated. Other regions take care of actually generating the pitches which will be sounded by the bowing motion. The speed of the bow and the closeness of the bow to the bridge are respectively modeled by $\theta$ time derivative and the apparent finger thickness t. The attributes of additional fingers can be used to control additional parameters. The variables of the bowling region are all monophonic. The rate of change of 8 of the first finger can be mapped to controller codes like MIDI breath controller, foot controller, or MIDI volume. SimilarlY, the apparent thickness of the finger t may also be mapped to these or other MIDI controller codes. If a second finger is in the region, the apparent distance between one two may be mapped to MIDI pitch wheel or MIDI modulation wheel.

Another type of region is the conducting region. This region is played somewhat like a bowed region. The idea is that a given change of $\theta$ sends a MIDI clock code. Thus the tempo of sequences can be controlled by gesturing. As in a bowed region, other attributes can cause other MIDI codes to be sent. In particular, additional fingers may trigger sequences to start or control the relative volume of various MIDI channels. In this manner the player acts as conductor controlling his MIDI sequences in real time.

One can also use a control region which allows the VideoHarp performer to send arbitrary MIDI codes for each subrange of $\theta$. Usually this is used to send MIDI program change codes. These program change codes can be used to change the VideoHarp to another preset instrument, i.e., another set of regions using the control region.

While a presently preferred embodiment of practicing the invention has been shown and described with particularity in connection with the accompanying drawings, the invention may otherwise be embodied within the scope of the following claims.

What is claimed is:

1. A gesture sensing device for controlling the motion of mechanical objects or the generation of music or light comprising: a physical instrument and a gesture mapping means, the physical instrument comprising: a plurality of gesture sensing surfaces joined along an edge; a light source located along the joined edge which illuminates an area above each gesture sensing surface; a reflective means for each gesture sensing surface located at an edge opposite the light source; and a sensor aligned with the light source via the reflective means such that the sensor detects a pattern of light and shadow falling on it as a result of a plurality of light occluding objects being placed in a gesture sensing plane in close proximity to the gesture sensing surfaces and wherein the pattern of light is used by the gesture mapping means to generate a plurality of output signals for controlling the motion of mechanical objects or the generation of music or light.

2. The device as described in claim 1 wherein there are two gesture sensing surfaces.

3. The device as described in claim 2 wherein the two gesture sensing surfaces are joined at an acute angle.

4. The device as described in claim 2 wherein the sensor is located between the two gesture sensing surfaces.

5. The device as described in claim 2 wherein the reflective means comprises a mirror assembly with a plurality of mirrors.

6. The device as described in claim 1 wherein the gesture sensing surface has a plurality of regions which are mapped into different output signals.

7. The device as described in claim 6 wherein the output signals for a first region are determined by inputs from another region and by gestures in the first region.

8. The device as described in claim 4 wherein the gesture mapping means is located between the two gesture sensing surfaces.

9. The device as described in claim 8 wherein the gesture mapping means comprises a control means.

10. The device as described in claim 1 wherein there are two areas above each gesture sensing surface which are illuminated by the light source and wherein a pattern of light and shadow is detected for each area by the sensor to assist in determining the output signals.

11. The device as described in claim 1 wherein a microphone is located near the gesture sensing surface and is electrically connected to the gesture mapping means.

12. The device as described in claim 1 wherein the output signals are MIDI signals.

13. The device as described in claim 1 wherein the gesture mapping means uses the following steps to generate the output signals: (a) getting a ray list from the sensor; (b) creating an object list for the ray list; (c) assigning each object from the object list to a region; and (d) evaluating each region to generate output signals.

* * * * *